2,999,736
HIGH PURITY SILICON
Harold Shalit, Drexel Hill, Pa., assignor to Houdry Process Corporation, Wilmington, Del., a corporation of Delaware
No Drawing. Filed Jan. 7, 1959, Ser. No. 785,329
2 Claims. (Cl. 23—223.5)

This invention relates to the preparation of high purity silicon, and particularly to the removal of trace amounts of boron compounds from compounds of silicon.

It has long been recognized that the difficulty of the purification of a material was dependent upon the permissible concentration of impurities in the product and that it has been difficult to prepare any material in which the total concentration of impurities was of the magnitude of a few parts per billion. Not only has there been difficulty in devising purification methods suitable for "ultra purification" but also there has been difficulty in devising analytical procedures effective in measuring either the magnitude or the identity of the impurities. The spectograph permits the detection of a few parts per million of impurties in certain elements, and for some purposes, materials free from spectographically detectable amounts of impurities are quite satisfactory. However, silicon which is merely spectographically pure silicon may contain more impurities than are permitted in the silicon employed as a starting material in the manufacture of semi-conductors.

Prior workers have emphasized zone-melting techniques for ultra purification of materials. In one embodiment of the zone-melting procedure, a vertical rod of a material to be purified (e.g. silicon) may be subjected to a vertically shiftable furnace heating only a thin cross-section of the rod, and the furnace first melts an upper portion of the rod, and then successively lower portions, a thin section at a time. The upper part of the rod is purified to the extent that the impurities are concentrated in the down-moving zone of molten material. In the narrow melting zone, there is a tendency for certain impurities to migrate into the molten material and away from the currently solidifying material. The removal of trace amounts of boron from silicon is not readily accomplished by the zone-melting technique. Particular attention must be given to boron removal in procedures designed to produce high purity silicon.

Heretofore, it has been known that complex fluoroacids can be formed in aqueous hydrofluoric acid solutions with beryllium, boron, aluminum, silicon, germanium, phosphorous, columbium, zirconium and/or other elements as the nucleus of the fluoro complex. The relative acidities of some of such complex fluoro-acids in aqueous and non-aqueous systems have been noted, as have the volatilities of some of the corresponding fluoride compounds. Gaseous uranium hexafluoride and/or other fluoride containing compounds of uranium have been employed in preparing uranium and/or in isotope separation, but volatile fluoro compounds have generally not been employed as intermediates in the purification of elements from the corresponding ores. The co-distillation, co-crystallization and entrainment problems among the compounds related to the complex fluoro acids have made it appear that fluoro derivatives were not suitable in achieving sharp separations among the fluoro compounds.

In accordance with the present invention a material containing silicon or a compound of silicon is treated with a fluoride material to prepare silicon tetrafluoride and the silicon tetrafluoride is purified to remove certain impurities including all of the boron trifluoride impurity initially present in the silicon tetrafluoride. This separation of the trace amounts of boron trifluoride from a major amount of gaseous silicon tetrafluoride is accomplished by the extraction of boron trifluoride from gaseous silicon tetrafluoride by absorption in a liquid containing a major molar amount of hydrogen fluoride and a minor molar amount of an alkyl mononuclear aromatic hydrocarbon containing at least two alkyl substituents, preferably having meta configuration. The complex formed by the reaction of the aromatic hydrocarbon (e.g. xylene or mesitylene) and anhydrous hydrogen fluoride and boron trifluoride has a high solubility in liquid hydrogen fluoride. The boron trifluoride has a very low equilibrium vapor pressure above this solution. Silicon tetrafluoride, on the other hand, has much lower tendency to form a complex in this system and has a relatively high equilibrium vapor pressure above this solution. Thus, the gaseous silicon tetrafluoride can be separated sharply from the boron complex. In other words, in the non-aqueous system, boron trifluoride is a sufficiently strong acid to react with a weak base such as xylene in the presence of anhydrous liquid hydrogen fluoride to form a stable soluble complex, but silicon tetrafluoride is too weak an acid to form a very stable complex with xylene and hydrogen fluoride. The separation is slightly analogous to the separation of a minor amount of hydrogen chloride from a large volume of carbon dioxide by extraction with an excess of an aqueous slurry of aluminum hydroxide, inasmuch as hydrogen chloride is a sufficiently strong acid to combine with aluminum hydroxide but carbonic acid is not. The purified gaseous silicon tetrafluoride, after being freed from trace amounts of boron trifluoride, is desirably subjected to further purification by cooling to a temperature between $-20°$ C. and $-50°$ C., whereby some impurities are removed from the gas by partial condensation. The purified silicon tetrafluoride gas, whether or not purified by the partial condensation step, is treated with an element higher in the electromotive series than hydrogen to liberate elemental silicon. Such silicon, by reason of its freedom from boron impurities, may be doped and converted to semiconductors by conventional procedures.

The invention is further clarified by reference to a plurality of examples.

Example 1

An intermediate grade of silicon, containing not more than 220 parts per million of impurities, and containing 200 parts per million of boron is prepared by any suitable purification method, such as by the zone-melting of a technical grade of silicon. This intermediate grade of silicon is treated with elementary fluorine to form a gaseous mixture consisting essentially of silicon tetrafluoride and boron trifluoride, the molar ratio of silicon tetrafluoride to boron trifluoride being approximately 5000:1.

In order to remove the trace amounts of boron trifluoride from the gaseous silicon tetrafluoride, the gas is transferred to a pressure vessel maintained at several atmospheres pressure, and containing a liquid filling from about 5% to 10% of the volume of the vessel. This liquid consists of a predominant molar concentration of hydrogen fluoride and a minor amount of an alkyl mononuclear aromatic hydrocarbon, such as mesitylene.

The reaction mixture is agitated for about 7 hours at room temperature to assure the extraction of all of the boron trifluoride with the mixture of hydrogen fluoride and mesitylene. The vessel and contents are cooled to $0°$ C. to condense more of the mesitylene and to decrease the total weight of hydrogen fluoride and mesitylene remaining in the vapor phase. Thereafter, the gas not dissolved in the mixture of hydrogen fluoride and mesitylene by the ultra purification step is withdrawn and cooled to about −50° C. by passage through a Dry-Ice trap to remove more of the vapors of mesitylene and hydrogen fluoride. The thus purified silicon tetrafluoride gas is transferred to a pressure vessel wherein silicon is prepared by reaction with molten sodium. The gaseous silicon tetrafluoride reacts with an excess of molten sodium to form sodium fluoride and high purity silicon. The high purity silicon is separated from the sodium fluoride and is found to be free from measurable amounts of boron.

Example II

A technical grade of high silica sand is treated with 5% nitric acid at 70° C. for 30 minutes in countercurrent leaching operations. Minor amounts of compounds of iron, sodium and the like are removed by the acid leaching operation. The residual sand is dried during passage for one hour through a drum drier. The dried sand leaves the drum at about 150° C., and is suspended in a well-agitated aqueous solution of concentrated hydrofluosilicic acid. The sand is introduced into the suspension at a rate stoichiometrically equal to the rate of introduction of nearly anhydrous hydrogen fluoride. The reaction of the hydrogen fluoride with the silica in the hot concentrated agitated hydrofluosilicic acid solution forms additional silicon tetrafluoride, hydrofluosilicic acid and water. The temperature and pressure are adjusted to distill and recover a gas stream rich in silicon tetrafluoride, a concentrated hydrofluosilicic acid solution recycled to the agitated solution, and a dilute hydrofluosilicic acid solution containing slightly more than 2 mols of water per mol of sand, said dilute acid being withdrawn as a by-product. The evolved gases are cooled and passed through a volume of anhydrous hydrogen fluoride to remove traces of water. By counter flow arrangements, the anhydrous HF can dehydrate the silicon tetrafluoride stream, and the wet hydrogen fluoride can be injected into the agitated suspension of sand in hydrofluosilicic acid. After such dehydration, the silicon tetrafluoride gas stream can be passed through a bath of liquid hydrogen fluoride cooled to about −50° C. The gas stream removed from the cooled liquid hydrogen fluoride consists predominantly of silicon tetrafluoride contaminated by only minor amounts of impurities.

The thus prepared silicon tetrafluoride gas is subjected to the ultra purification step of solvent extraction with a mixture of liquid hydrogen fluoride and a mononuclear alkylated aromatic hydrocarbon such as xylene at a temperature of about 10° C. The purified silicon tetrafluoride is compressed to about 2 atmospheres' pressure in a pressure vessel containing about 5% by volume of a mixture of liquid hydrogen fluoride and xylene, there being about 11 mols of hydrogen fluoride per mol of xylene. The xylene and hydrogen fluoride combine with the boron trifluoride impurity to form the xylene hydrogen fluoride-$BF_3$ complex. The silicon tetrafluoride gas, after being washed with the hydrogen fluoride xylene mixture for about 30 minutes, is passed through a cooling trap maintained at about −50° C. to remove traces of xylene or other impurities. The gas withdrawn from the −50° C. trap is silicon tetrafluoride of high purity.

The conversion of the silicon tetrafluoride to elemental silicon can be accomplished by the reaction of the ultra-pure gas with high purity sodium vapor. Ultra-pure silicon is prepared with primary reliance upon the volatility of silicon tetrafluoride above a dry mixture of liquid hydrogen fluoride and an aromatic hydrocarbon and upon the high vapor pressure of silicon tetrafluoride, relative to possible impurities, at temperatures within the range from about −50° to about −20° C. Although minor amounts of silicon tetrafluoride may be entrained with the impurities removed by either of the two important purification steps, the loss in yield of the silicon tetrafluoride does not impair the attractiveness of the relatively simple purification procedure. The general method relying upon said two steps permits the preparation of a high purity silicon tetrafluoride gas (e.g. containing only a few parts per billion of impurities) at a cost which is sufficiently attractive to tolerate the losses incident to the entrainment of silicon tetrafluoride in the streams of by-products and/or discarded impurities.

Example III

A technical grade of sand is mixed with a calcium fluoride ore and the mixture is introduced into concentrated sulfuric acid maintained at about 170° C. From such a reaction mixture, a wet gas stream is evolved comprising hydrogen fluoride, silicon tetrafluoride and minor amounts of sulfur dioxide, boron trifluoride and other volatile fluoride compounds. The gases are passed through an aqueous solution of ammonium fluosilicate and ammonium hydroxide, whereby purified crystals of ammonium fluosilicate are precipitated, most of the impurities being retained by the aqueous solution. The ammonium fluosilicate crystals are dried and the dry crystals are dispersed in liquid hydrogen fluoride, from which silicon tetrafluoride is distilled. The silicon tetrafluoride gas stream flows in countercurrent contact with a stream of liquid hydrogen fluoride in admixture with liquid meta xylene. The countercurrent contact is equivalent to many stages of batch treatment. The liquid mixture of hydrogen fluoride and xylene, containing the boron fluoride impurity extracted from the silicon tetrafluoride gas, is withdrawn from the countercurrent contact zone. The countercurrently treated silicon tetrafluoride gas is passed through a series of traps including a trap at about 0° C., and a trap maintained at about −50° C. The high purity silicon tetrafluoride fraction is converted to silicon by one or a series of chemical reactions. Gaseous silicon tetrafluoride may be treated with the vapors of calcium in a torch flame type of reactor in the presence of molten silicon. The thus prepared molten silicon is characterized by the presence of only trace amounts of impurities, which impurities are readily removable by a zone-melting step, whereby semiconductor grade silicon is prepared.

If desired, the silicon tetrafluoride may be converted to silicon tetrachloride by reaction with anhydrous magnesium chloride or aluminum chloride, and the thus prepared silicon tetrachloride may be reduced to silicon by reaction with sodium vapor in a torch flame type of reactor.

Obviously many modifications and variations of the invention as hereinbefore set forth may be made without departing from the spirit and scope thereof, and therefore only such limitations should be imposed as are indicated in the appended claims.

What is claimed is:

1. The method of preparing high purity silicon tetrafluoride which includes the steps of: passing a stream of gaseous silicon tetrafluoride countercurrently with a stream of anhydrous liquid hydrogen fluoride containing a hydrocarbon selected from the group consisting of meta xylene and mesitylene, whereby any trace amount of boron trifluoride is retained in the liquid and whereby gaseous silicon tetrafluoride free from boron trifluoride is separated; further purifying the silicon tetrafluoride by cooling to a temperature between −20° C. and about −50° C.; and recovering high purity silicon tetrafluoride from such cooling step.

2. The method of preparing high purity silicon which includes the steps of: preparing silicon tetrafluoride; purifying the silicon tetrafluoride by passing a stream of gaseous silicon tetrafluoride countercurrently with a stream of anhydrous liquid hydrogen fluoride containing a hydrocarbon selected from the group consisting of meta xylene and mesitylene and further purifying the silicon tetrafluoride by cooling at a temperature between −20° C.

and about −50° C. and recovering the gaseous silicon tetrafluoride from such cooling, whereby any trace amount of boron trifluoride contaminant is removed from the gaseous silicon tetrafluoride; and converting the thus purified silicon tetrafluoride to high purity silicon.

References Cited in the file of this patent

UNITED STATES PATENTS

| | | |
|---|---|---|
| 2,172,969 | Eringer | Sept. 12, 1939 |
| 2,419,504 | Schultze et al. | Apr. 22, 1947 |
| 2,904,404 | Ellis | Sept. 15, 1959 |

FOREIGN PATENTS

| | | |
|---|---|---|
| 656,098 | Great Britain | Aug. 15, 1951 |

OTHER REFERENCES

Mellor: "A Comprehensive Treatise on Inorganic and Theoretical Chemistry," vol. VI (1925), p. 935, Longmans, Green and Co.